Patented Mar. 9, 1937

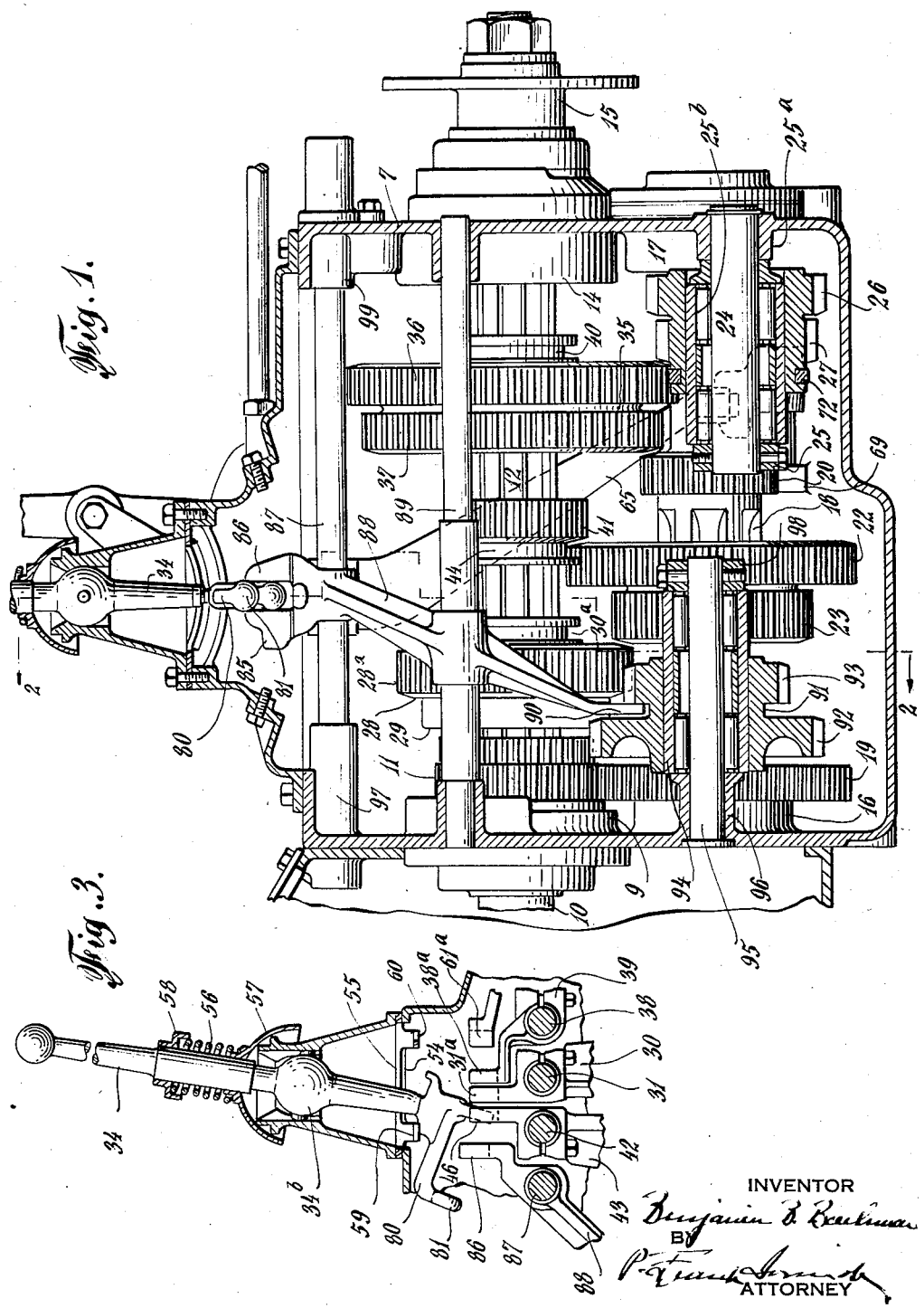

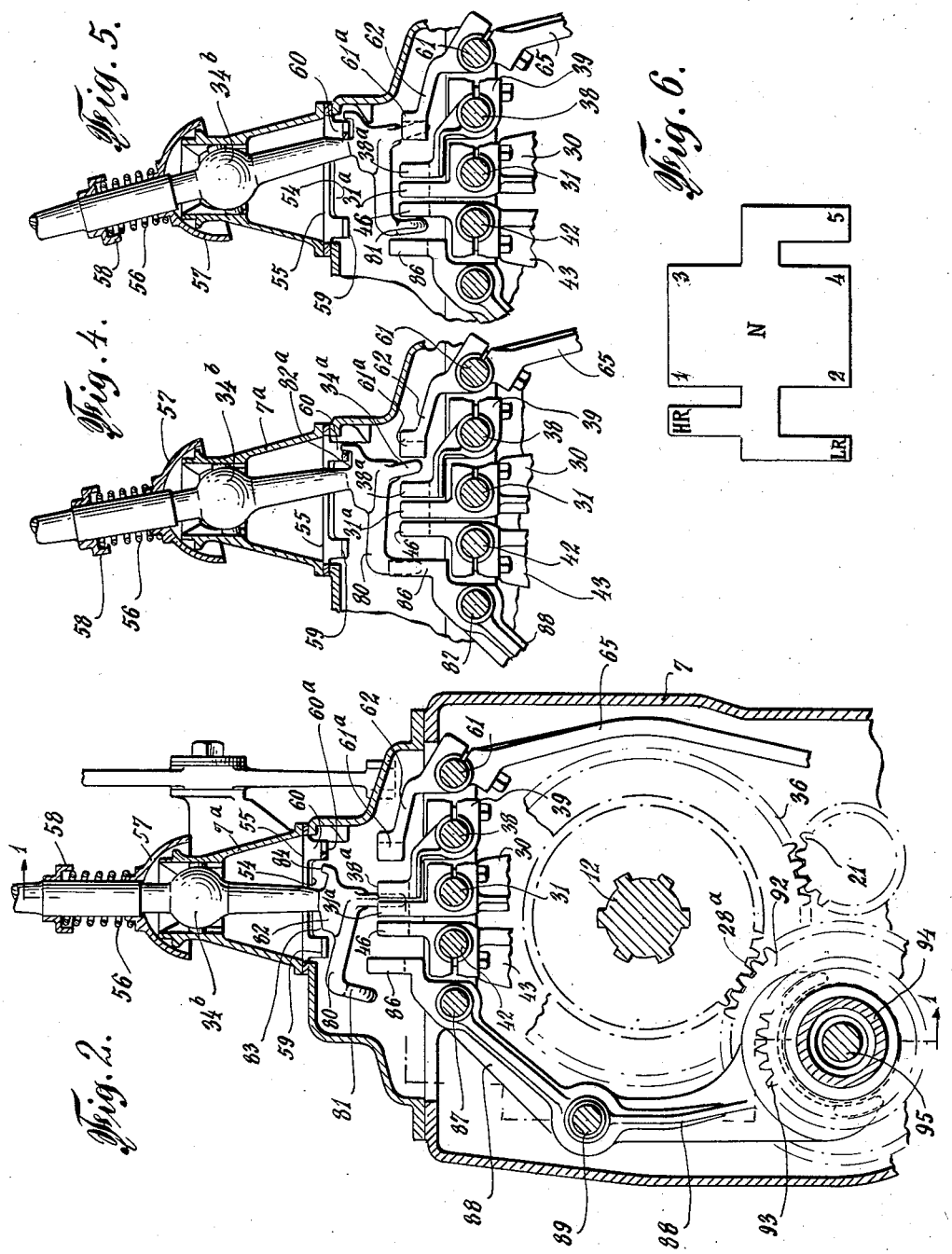

2,073,045

UNITED STATES PATENT OFFICE 2,073,045

POWER TRANSMITTING DEVICE

Benjamin B. Bachman, Philadelphia, Pa., assignor to The Autocar Company, Ardmore, Pa., a corporation of Pennsylvania Application December 22, 1932, Serial No. 648,331

8 Claims. (Cl. 74—473)

This invention relates generally to devices for transmitting power and is more especially adapted to a transmission mechanism of the so-called slidable gear type, as commonly employed in the construction and operation of motor vehicles, in which the power is generated by an internal combustion engine, together with means for effecting gear changes within said mechanism for producing different speed ratios between the driving and driven elements thereof.

In my co-pending application for Letters Patent, filed December 22, 1932 Serial No. 648,330 I have disclosed a transmission mechanism of a slidable gear design, wherein I provide for five forward speeds and a single reverse speed, in the transmittal of power from its source to the work, as in the operation of a motor vehicle, one of the important features of the invention of my said application residing in the use of a single shifting lever that is adapted to be manually actuated in a sequence and directionally to effect the various gear changes, in accordance with the standard shift diagram.

I have pointed out in my said application, especially in stating the objectives to which the invention thereof is directed, the shortcomings or disadvantages that are inherent to existing or proposed types of so-called over-speed transmission mechanisms, particularly with respect to their generally complicated and usually impractical design and the necessity, in many instances, of resorting to the employment of a secondary gear shifting lever and to gear shift lever movements that differ so radically from those which are recognized as standard that they immediately establish an operating hazard.

The invention of the present application, similarly to that of my co-pending case referred to, is generally directed to the broad objectives of the latter, insofar as concerns their common subject matter, but, in addition, is designed to extend the advantages which flow from a transmission mechanism possessing the characteristics disclosed in my said application, Serial No. 648,330 to a structure which embodies an additional, or what may be termed a high reverse speed gear train, with a single means for actuating the various movable gears into and out of functioning position, which, similarly to its counterpart in my aforesaid co-pending application, is movable through the standard shift diagram.

As is well known, in the operation of motor vehicles, especially trucks, to which application of my invention I have elected to confine this description more or less for the purpose of this disclosure, in addition to providing for the so-called extra forward or over-speed, it is desirable, in many forms of service, as in road construction work, that a truck should be capable of traveling backward at a higher rate of speed than may be obtained by the usual reverse transmission gearing, the distances in which the truck must operate in reverse gear frequently being considerable. Obviously, with the low gear ratio that is now utilized in standard transmission, the backward travel of the truck for a relatively long period of time presents an economic problem, not only in the truck operating costs but in the particular service in which the truck is functioning. Efforts have been made to respond to the demand for an efficient and practical transmission mechanism which may be incorporated in truck designs and afford an operating speed when in reverse, that will be appreciably greater than that which is obtainable by the usual reverse speed gearing. However, these attempts have been unsuccessful, not only due to the complicated mechanisms proposed, which, in many instances, involve the use of a secondary transmission mechanism for the higher reverse speed, and the inapplicability of such devices to existing or standard truck designs, either as a unit in new constructions or as a replacement, as in substitution for a conventional type of transmission, but, mainly because of the additional work imposed upon the vehicle operator in handling the shifting media, the movements of which in the majority of instances are such as tend to confuse one accustomed to the conventional shifting mechanism movements.

Therefore, it is the primary object of this invention to provide a simple and practical mechanism for attaining those advantages which flow from having available two reverse speed ratios in a transmission or gear set of the slidable gear type, in the transmittal of power from the source to the work, generally, and, specifically in those services where such different speeds are of recognized utility as in motor truck operation.

A further object of my invention is to provide two reverse speed ratios in a transmission mechanism as aforesaid which, structurally, will conform generally to the transmission of standard design, including the usual forward speeds thereof, or which may be of the so-called over-speed type, wherein an additional forward speed is at the disposal of the user.

A further object of my invention is the provision of a transmission mechanism having two reverse speed ratios, as hereinbefore set forth, whether of the conventional or of the over-speed type, which will eliminate or overcome those objections that are raised to present constructions, whereby it is sought to attain the benefits derived from two reverse speed ratios, by utilizing the customary gear shifting lever and providing a shift diagram therefor which will conform essentially to the standard shift diagram.

It is also an object of my invention to provide a gear shift lever of a simple and practical design which will be especially adaptable to the requirements of extra speed transmissions, of the slidable gear type, where it is desirable or necessary to have the lever movements correspond directionally, to those of its counterpart in the standard transmission, in the execution of those movements that are required for making the gear changes that are or may be common to both.

Other objects and advantages flowing from the practicing of my invention will doubtless present themselves as the description proceeds, and I would have it understood that I reserve unto myself all rights to the full range of equivalents, both in structure and in use, to which I may be entitled under my invention in its broadest application.

For the purpose of this disclosure, I have elected to illustrate and describe my invention as it may be embodied in a transmission mechanism of the over-speed type described in my heretofore referred to co-pending application, but I would have it understood that my invention may be embodied in other structures, providing for the conventional number of forward speeds or for the so-called extra speeds, within the scope of the appended claims.

In the drawings:

Figure 1 is a vertical longitudinal section of a transmission mechanism, such as disclosed in my said co-pending application, embodying my present invention.

Figure 2 is a vertical cross section taken on the line 2—2 of Figure 1.

Figures 3, 4, and 5 are vertical transverse sectional views of the shift lever and the gear actuating mechanisms with which it is associatable, respectively, illustrating the positions which the lever assumes for functioning the transmission for fifth or over-speed, high reverse and low reverse, and Figure 6 is a diagram of the various positions which the shift lever must assume for setting the gears of the construction for each of the various speeds indicated.

Referring now to the drawings in detail, wherein the structural elements that are common to the present showing and to that of my aforesaid co-pending application, are indicated by corresponding reference numerals, I provide the usual transmission housing 7 connectible to the clutch housing 8, in the conventional manner, which embodies a bearing 9 at its forward end for the drive shaft 10 carrying the pinion 11, the latter of which may be integral with said shaft, as in the form of a so-called stem gear, it being apparent that the driven shaft 12, coaxially alined with the drive shaft 10, is mounted at its forward end for rotation within the bearings 13 associated with the pinion 11. The rear end of said driven shaft extends beyond the bearing 14, whereby it is supported in the housing 7, to receive the usual flanged fitting 15 with which a complemental fitting of the customary universal joint is adapted to be connected, as in standard practice.

Mounted in the end wall bearings 16 and 17 of the housing 8, below the driven shaft 12 and in a plane parallel thereto, is the countershaft 18 which carries a gear 19 in constant mesh with the pinion 11 of the drive shaft 10, this countershaft also having keyed thereto a double gear having portions of major and minor diameter indicated at 22 and 23, respectively, and gears 20 and 21.

Supported at one end by the bracket 25 and at its opposite end within the bearing 25ᵃ, integral with the rear wall of the housing is a stub shaft 24 for the low reverse speed idler, in the form of a double gear 26 and 27 which is slidable longitudinally of the bearing sleeve 25ᵇ rotatable on said shaft, this idler shaft being offset to the left of the counter-shaft looking toward the front end of the transmission housing.

The slidable gears which are actuable longitudinally of the driven shaft 12, through the medium of their splined connection therewith, comprise the gear 28 embodying a clutch portion having internal teeth 29, a double gear 35 and the gear 41, the clutch teeth 29 being adapted for engagement with the peripheral or external clutch teeth of the pinion 11.

The gears 28, 35 and 41, through the medium of shifting forks (not shown for the sake of clarity) engaged with their respective hub grooves or collars 30ᵃ, 40 and 44 are each movable fore and aft of the shaft 12 by the actuation of the appropriate shift rod when the jaw thereof is entered by the toe 34ᵃ of the shift lever 34, the backward movement of the rod 38 meshing the driven shaft gear 36 with the counter-shaft gear 21 for first speed while the movement of said rod in a reverse direction engages the gear 37 with the counter-shaft gear 20 for second speed. Similarly, the rearward movement of the slide rod 31 effects the engagement of the external teeth 28ᵃ of gear 28 with the counter-shaft gear 23 for third speed, the fourth speed being in the nature of a direct drive through the engagement of the clutch teeth 29 of the gear 28 with the complemental teeth of the pinion 11 in response to the forward actuation of the said slide rod 31, it being understood, of course, that the said pinion 11 is in constant mesh with the counter-shaft gear 19 during the functioning of the transmission.

The structure thus far described is common to the showing of this and my co-pending application, heretofore referred to, and the movements of the gear shifting lever 34 for actuating the slidable gears to the positions which they must assume for producing the four different forward speed ratios are identical in the two cases.

As will be noted, the gear shift lever 34, in the present instance, embodies a lateral, upwardly inclined, extension 80 above its toe 34ᵃ which terminates in a relatively annularly disposed dependent member adapted to function as a supplemental toe 81, as hereinafter described. This extension 80 adjacent the shank or stem of the lever 34, merges into a ledge 82 corresponding generally in shape and function to the lug 53—53ᵃ of my co-pending application, which embodies a curved shoulder 83 at one side and, at its opposite side terminates in an upward angularly directed hook 84, the shoulder 83 and said hook corresponding to the projections 53 and 53ᵃ of the structure of my co-pending application in cooperating with the flanges or ways 59 and 60 of the guard plate 55, to limit the range of lateral movement of the shift lever 34 as it is urged into, or retained in, its normal position by the spring 56 supported between the cap 57 and the collar 58.

From the foregoing it will be apparent that the jaws of the slide rods 31 and 38 may be respectively engaged by moving the shift lever 34 to the right or to the left and the selected rod actuated in the desired direction as the shoulder 83 and hook 84 integral with the ledge 82 traverses the slot or ways 54.

Now, if it is desired to mesh the teeth of gear 41 with gear 22 on the countershaft 18, whereby the fifth or over-speed drive is obtained, the lever 34 must be depressed in opposition to the spring 56 to permit the shoulder 83 of the ledge 82 to enter beneath the guard or flange 59, in order that the lever may be canted sufficiently to the right to enable its toe 34ᵃ to enter the jaw 46 of the slide rod 42, which is the actuator for the said gear 41 through the medium of the fork connection, indicated at 43 ((see Figure 3). As set forth in my co-pending application, the train of transmission for the overspeed is from the pinion 11 to the countershaft gear 19 and from the aforesaid gear 22 to the gear 41 on the driven shaft 12.

It will be observed that in the present invention the guard 60 embodies a track 60ᵃ, with which the upwardly directed hook 84 of the ledge 82 is adapted to engage when the lever 34 is depressed and rocked to the left as the ball 34ᵇ rotates within its socket 34ᶜ in the lever housing 7ᵃ, it being obvious that the depression of the lever will permit the said hook to pass beneath the under surface of the track 60ᵃ, as the lever is canted or tilted, to bear against the outer face thereof, to enter the dependent supplemental toe 81 between the jaws 85—86 of the slide rod 87 to which the lever 88, mounted for movement longitudinally of the rod 89 and terminating in the fork 90 is connected (see Figure 4). This fork 90 is located within the fork collar or groove 91 of the double gear idler, embodying the major and minor diameter portions 92 and 93 respectively, which is slidable longitudinally of the bearing sleeve 94 rotatable upon the stub shaft 95 supported between the socket 96 at the front end of the housing 7 and the bracket 98 and to the left of the counter-shaft 18. Similarly, to those functioning as actuators for the other slidable gears the rod 87 moves in the bearings 97 and 99 at the respective ends of the transmission housing 7, and is displaceably locked in either of the two positions to which it is shiftable by the usual latch or spring actuated pin. With the supplemental toe 81 of the lever 34 engaged with the jaw 85—86 as explained, it will be manifest that the forward movement of the lever 34 will effect a corresponding movement in the reverse direction of the slide rod 87 and a concurrent shifting of the idler 92—93 to engage respectively with the driven shaft gear 28ᵃ and the portion 23 of the counter-shaft gear 22—23, the train of transmission, as will be apparent, being from the pinion 11 to the counter-shaft gear 19 in constant mesh therewith, and from the counter-shaft gear 23 to the idler gear 93, the idler with its gear 92 of major diameter, in mesh with the teeth 28ᵃ of the driven shaft gear 28 functioning to drive the latter gear in a direction opposite to that in which it turns when operating in the third speed forward drive, as when engaged with the counter-shaft gear 23, as heretofore described.

If it is desired to function the transmission mechanism in its low or normal reverse speed, the shift lever 34 is rocked in the same lateral direction (to the left) through which it must move for setting the gears for the high reverse drive, except that it must traverse a greater arc to permit its toe 34ᵃ to engage with the jaws 61ᵃ of the slide rod 61, as shown in Figure 5, the lever being then moved backwardly to actuate the rod 61 and its interconnected elements in the opposite direction to engage the minor diameter portion 27 of the double idler gear with gear 36 of the driven shaft and simultaneously mesh the major diameter idler portion 26 with the counter-shaft gear 21. When the shift lever is in the extreme left position (Figure 5) which it must assume to engage the fork 61ᵃ of the low reverse idler gear, as just described, the surface 82ᵃ, of the ledge 82, inwardly of the hook 84 contacts with or abuts upon the inner face of the track 60ᵃ, thereby limiting the lateral rocking movement of the lever and bringing its toe 34ᵃ into registering position with the jaw 61ᵃ, the said surface 82ᵃ traversing the track as the lever is moved to the gear-setting position. As will be clearly evident, in shifting back to neutral, or in manipulating the lever 34 to any of the several positions in which it is effective in its normal spring-supported position, the spring 56 functions to automatically locate the ledge 82 with its shoulder 83 and hook 84 within the ways or groove of the guard plate 55, similarly to its counterpart in the structure of my co-pending application.

From the foregoing description of my invention, it will be manifest that I attain the objectives to which it is directed in an extremely simple and practical manner, the shift lever structure and the elements which cooperate therewith in providing for the increased range of lateral movement, for effecting predetermined gear changes, being susceptible of wide application in the construction and functioning of sliding gear transmissions.

For example, in lieu of the auxiliary or supplemental toe 81 being effective in the shift into high reverse, it may function in a shift into a forward speed, or the lever 34, when said toe is engaged with a cooperating jaw, might be movable both forwardly and rearwardly from neutral for such speeds, as may be determined by the specific transmission design, in which this important element of my invention may be incorporated.

I claim:

1. A gear shifting mechanism for a change speed transmission having a plurality of slides, each embodying a jaw, mounted in a common plane for longitudinal movement, a shift lever supported from said transmission for movement in the direction of its longitudinal axis and for arcuate fore and aft and lateral movement, said lever embodying an axially alined jaw-engaging toe, means on said lever above said toe adapted to cooperate with a portion of said lever support to limit the lateral arcuate movement of said lever under pre-determined operating conditions to render the toe thereof engageable only with the jaws of certain of said slides a lateral extension on said lever forming a supplemental toe engageable only with the jaw of another of said slides in response to an initial movement of said lever on its longitudinal axis, whereby said limiting means will be rendered non-effective, to permit of the lateral movement of said lever to enter said supplemental toe in the jaw of said latter slide, a guideway on said lever support and means on said lever adapted to enter and traverse said guideway in response to and during the engagement of said supplemental tow with the jaw of said latter slide.

2. The combination with a change speed transmission having gearing and mechanism for shifting certain gears thereof to engage coacting gears in producing different speed ratios, said mechanism including a plurality of slides, each embodying a jaw, of a shift lever, a mounting therefor, a spring for normally supporting said lever in a pre-determined relationship to said mounting, said lever embodying a jaw-engaging toe and means adapted to cooperate with said mounting to limit the lateral arcuate movement of said lever when in its normally supported position to render its toe engageable only with the jaws of certain of said slides, a lateral extension on said lever forming a supplemental toe, said lever being movable in opposition to said spring to render said cooperating limiting means non-effective, whereby said lever may be moved laterally to enter said supplemental toe in the jaw of another of said slides, the jaw of said latter slide being engageable only by said supplemental toe, and fixed means associated with said lever support and said lever respectively, adapted to cooperate to positively guide the movement of said shift lever when the supplemental toe thereof is engaged with said latter jaw.

3. The combination with a change speed transmission having gearing and mechanism for shifting certain gears thereof to engage coacting gears in producing different speed ratios, said mechanism including a plurality of slides each embodying a jaw, of a shift lever, a mounting therefor, said shift lever being rockable in said mounting through intersecting arcs, yieldable means for maintaining said lever in a pre-determined normal operating position within said mounting whereby said lever may be rocked laterally to engage the jaw of a pre-determined one of certain of said slides for movement in an intersecting arc to actuate such slide longitudinally, an element carried by said lever formed for engagement only with the jaw of another slide, said lever, when in a predetermined position, being longitudinally movable in opposition to said yieldable means to locate said element for engagement with said latter jaw, said element being adapted to engage said jaw in response to a succeeding lateral movement of said lever, and means effective only when said element is engaged with said latter jaw for guiding the slide-shifting movement of said lever.

4. The combination with a change speed transmission having gearing and mechanism for shifting certain gears thereof to engage coacting gears in producing different speed ratios, said mechanism including a plurality of slides each embodying a jaw, of a shift lever, a mounting therefor embodying a ball and socket connection, the said lever being movable in said mounting through intersecting arcs, yieldable means cooperating with said lever and said mounting to support said lever in a normally pre-determined operating position within said mounting, means for limiting the lateral arcuate movement of said lever when supported in its aforesaid pre-determined normal operating position to render said lever engageable only with the jaw of a pre-selected one of certain of said slides and an element carried by said lever formed for engagement only with the jaw of another slide, said lever being bodily displaceable from its normally supported position to render said limiting means non-effective and increase its range of lateral movement in one direction to engage said element with said latter jaw or in the opposite direction, through varying arcs to engage said lever with the jaw of either of two slides with which it is normally non-engageable, as may be pre-determined.

5. The combination with a gear set, of mechanism for shifting the gears for conditioning said gear set to function in a preselected one of five speeds forward and two reverse speeds, said mechanism including five gear shifting rods, the two marginal rods being respectively effective only in conditioning the gear set for operation in one or the other reverse speeds, a shifting lever, a mounting therefor, means for supporting said lever from said mounting for longitudinal axial movement and arcuate movement on intersecting axes, means for limiting lateral arcuate movement of said lever for engagement only with certain of said shifting rods, said lever being depressible upon its longitudinal axis to render said limiting means non-effective to increase the range of arcuate lateral movement of said lever for engagement with either of said marginal rods and a third rod, as may be preselected, and means for guiding the movements of said lever in engagement with the preselected one of the three latter rods, said guiding means functioning to retain said lever in position upon the completion of such movement to condition the gear set for operation in the preselected speed.

6. The combination with a gear set for motor vehicles having five speeds forward and high and low reverse speds, of mechanism for conditioning said gear set to function in a preselected one of such speeds, said mechanism including five gear shifting rods mounted for actuation in a common plane, one of the two outer rods being effective only in conditioning the gear set for operation in high reverse speed, the other outer rod being effective only in conditioning the gear set for functioning in low reverse speed, a shifting lever engageable with each of said rods, a mounting therefor, means for supporting said lever from said mounting for longitudinal axial movement and for arcuate movement on intersecting axes, means for limiting lateral arcuate movement of said lever for engagement only with either of two intermediate rods, said lever being depressible on its longitudinal axis to render said limiting means non-effective to increase the range of arcuate lateral movement of said lever for engagement with either of said two marginal rods and with a third rod, as may be preselected, and means for guiding the movements of said lever when engaged with the preselected one of the three latter rods.

7. A change speed transmission for motor-vehicles, for producing five forward speeds and high and low reverse speeds, including five parallel gear-shifting slide rods, a single gear shifting lever for conditioning said transmission for functioning in a preselected one of any of said speeds having an axially disposed slide-rod engaging toe and a supplemental toe laterally offset therefrom, a mounting for said lever, means for supporting said lever from said mounting for relative longitudinal adjustment and arcuate movement on intersecting axes, means for limiting the arcuate movement of said lever from neutral to the left to engage said axial toe with one of said inner rods for forward movement for first speed and backward movement for second speed, to the right of neutral for engagement with the contiguous inner rod, for forward movement for third speed and rearward movement for fourth speed, and means for rendering said limiting means non-effective solely in response to the depression of said lever in the direction of its longitudinal axis, for arcuate movement to the right of neutral for engaging said axial toe with the third inner rod for backward movement for fifth speed, to the left of neutral for engaging said laterally offset toe with the marginal rod next to said third inner rod, for forward movement for high reverse speed and to the left of neutral for engaging said axially alined toe with the remaining marginal rod for backward movement for low reverse speed, as may be preselected, the range of lateral movement of said lever for engagement with the third inner rod and the two marginal rods being greater than its corresponding movement for engagement with the two remaining inner rods.

8. A change speed transmission for motor-vehicles for producing five forward speeds and high and low reverse speeds, having five slidable gear-shifting rods, each embodying a single jaw, a gear shifting lever provided with two relatively laterally spaced shifting rod-engaging elements actuatable for conditioning said transmission for functioning in a preselected one of any of said speeds, a mounting for said lever, means for supporting said lever from said mounting for movement on its longitudinal axis from one to another of two positions and for arcuate movement on intersecting axes in each of said positions, means for limiting the arcuate movement of said lever when in one supported position, from neutral to the left for engaging the jaw of the rod contiguous to the right marginal rod, for forward movement for first speed and backward movement for second speed, to the right of neutral for engagement with the jaw of the next intermediate rod for forward movement for third speed and rearward movement for fourth speed, said limiting means being rendered non-effective solely in response to the longitudinal movement of said lever to its second supported position to increase the range of lateral movement of said lever for actuation to the right of neutral for engagement with the jaw of the remaining intermediate rod and backward movement for fifth speed, to the left of neutral for engagement with the jaw of the left marginal rod for forward movement for high reverse speed and to the left of neutral for engagement with the jaw of the right marginal rod for backward movement for low reverse speed, and means dually functioning to guide the lever in each of the three latter conditioning operations and to retain the lever in its second supported position upon the completion of any one of such operations, one of said rod-engaging elements functioning only in the conditioning of the transmission for producing high reverse speed.

BENJAMIN B. BACHMAN.